United States Patent Office 2,961,723
Patented Nov. 29, 1960

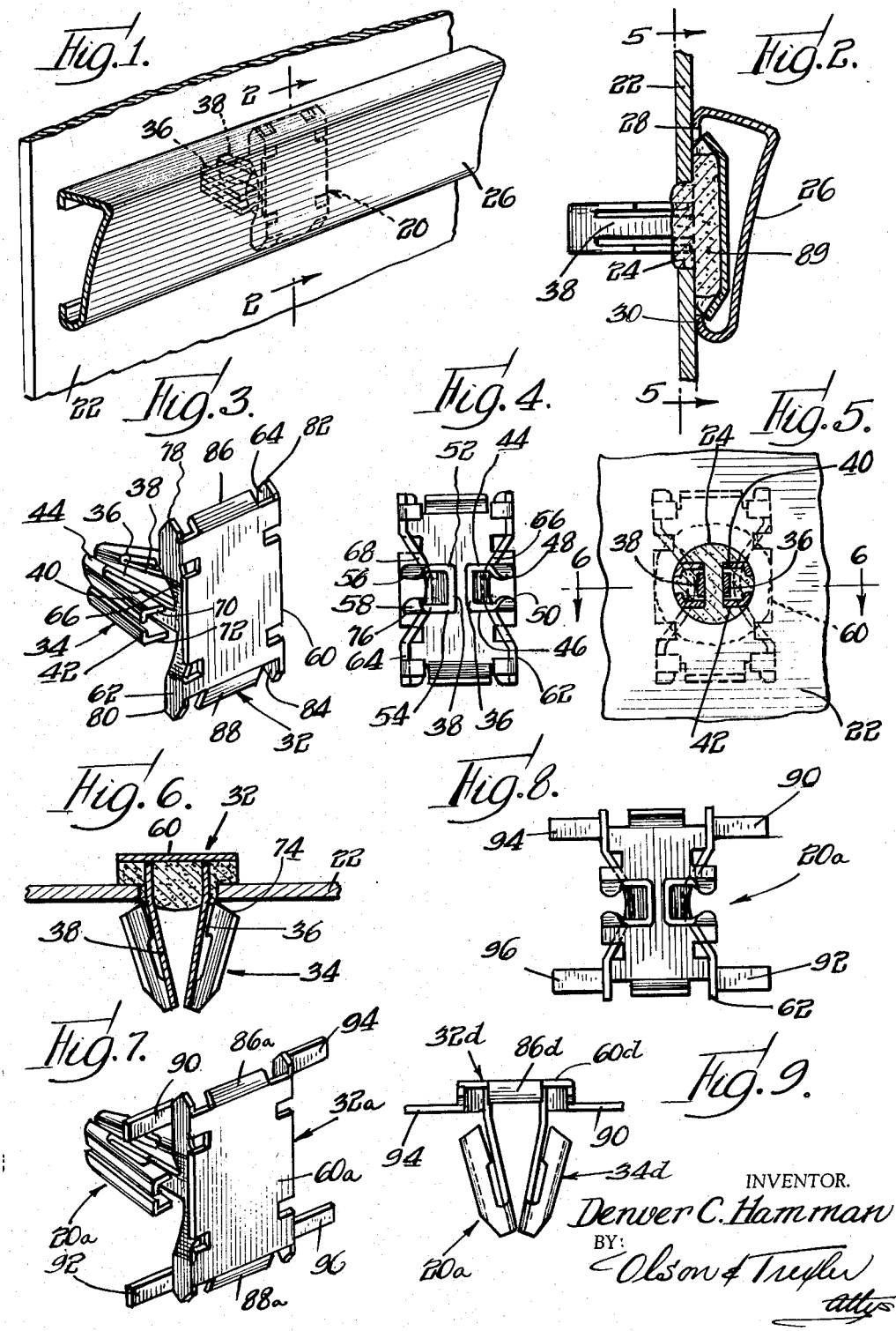

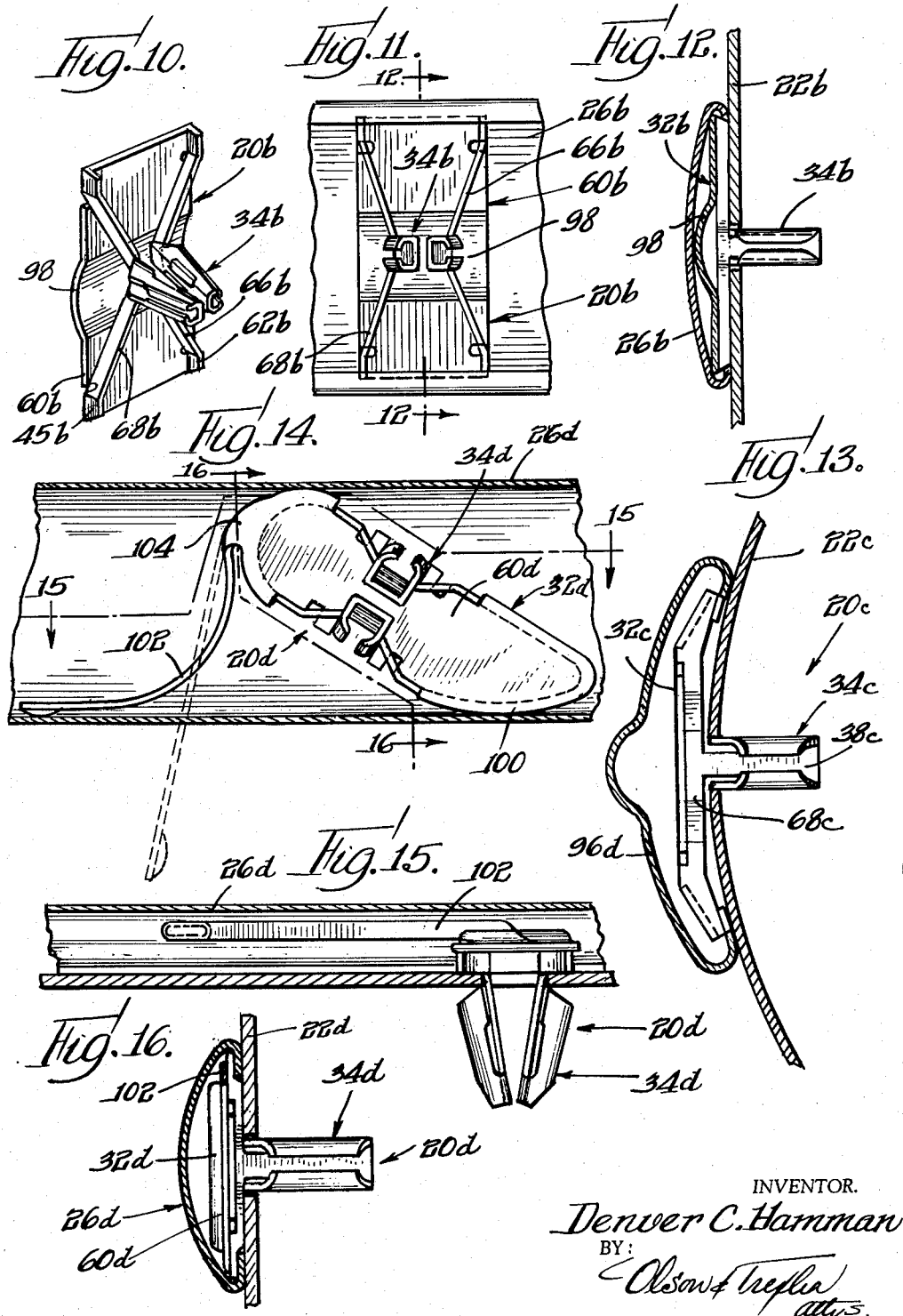

2,961,723
MOLDING CLIP

Denver C. Hamman, Palatine, Ill., assignor to Illinois Tool Works, Chicago, Ill., a corporation of Illinois Filed Dec. 6, 1957, Ser. No. 701,096

10 Claims. (Cl. 24—73)

The present invention relates to a novel fastening device or clip, and more particularly to a novel fastening device adapted to be applied to an apertured workpiece.

An important object of the present invention is to provide a novel fastening device or molding clip having a stud portion adapted to be snapped into a workpiece aperture and a head portion which is constructed and connected to the stud portion in a manner so as to provide a substantially uninterrupted or continuous section for covering a workpiece aperture substantially completely.

A more specific object is to provide a novel fastening device or molding clip of the type described above which is adapted to retain a body of sealing material so as to insure substantially complete sealing of a workpiece aperture.

A further object of the present invention is to provide a novel fastening device or molding clip having a head portion and a stud portion connected thereto in a novel manner for facilitating application of the device to an apertured workpiece.

Another more specific object of the present invention is to provide a novel fastening device or molding clip adapted to be applied to an apertured workpiece and constructed so that a head portion thereof may be readily modified for bridging workpiece apertures of varying widths without increasing the amount of stock material required for the device.

Other objects and advantages of the present invention will become apparent from the following description and the accompanying drawings, wherein:

Fig. 1 is a fragmentary perspective view showing a molding strip mounted on an apertured workpiece by means of a fastening device or clip incorporating features of the present invention;

Fig. 2 is an enlarged cross sectional view taken generally along the line 2—2 in Fig. 1;

Fig. 3 is a perspective view showing a fastening device or molding clip incorporating features of the present invention;

Fig. 4 is an entering end view of the novel clip;

Fig. 5 is a sectional view taken along line 5—5 in Fig. 2;

Fig. 6 is a sectional view taken along line 6—6 in Fig. 5;

Fig. 7 is a perspective view showing a modified form of the present invention;

Fig. 8 is an entering end view of the device shown in Fig. 7;

Fig. 9 is a side elevational view of the device shown in Figs. 7 and 8;

Fig. 10 is a perspective view showing another slightly modified form of the present invention;

Fig. 11 is an entering end view of the embodiment shown in Fig. 10, and further showing the device assembled with a molding strip;

Fig. 12 is a sectional view taken along line 12—12 in Fig. 11 and further shows the device applied to an apertured workpiece;

Fig. 13 is a cross sectional view similar to Fig. 12 but shows a modified form of the present invention;

Fig. 14 is a partial sectional view showing a clip incorporating another modified form of the present invention assembled with a molding strip;

Fig. 15 is a sectional view taken along line 15—15 in Fig. 14; and

Fig. 16 is a cross sectional view taken generally along line 16—16 in Fig. 14.

Referring now more specifically to the drawings, wherein like parts are designated by the same numerals throughout the various figures, a fastening device or molding clip 20 is shown in Figs. 1 through 6. This fastening device is adapted to be applied to an apertured work structure or panel 22 having an opening or aperture 24 therethrough for mounting another workpiece such as a molding strip 26. The molding strip may be shaped in accordance with various known constructions and is preferably provided with inturned opposite marginal flanges 28 and 30 for engagement with the clip in the manner described below.

The fastening device or clip 20 is formed from suitable sheet material such as sheet steel and is provided with a head portion 32 and a stud portion 34. The stud portion 34 includes a pair of axially extending and inwardly inclined legs 36 and 38, which legs are respectively connected with opposite margins of the head portions in the manner described in detail below. Wings 40 and 42 extend laterally from the leg section 36 and are joined thereto along relatively short entering end portions 44 and 46 of the longitudinal margins of the leg element. This provides a relatively stiff connection between the wings and the leg element 36 and still enables the wings to flex inwardly relative to the leg element during application of the device to an apertured workpiece. Outer longitudinal margins of the wings are turned inwardly toward each other to provide flanges 48 and 50 which present smooth outwardly facing surfaces engageable with a margin of the workpiece aperture 24 during application of the device to the workpiece for facilitating entry of the stud portion through the aperture.

The leg element 38 has additional laterally outwardly extending wings 52 and 54 projecting therefrom. These wings are substantially identical to the above described wings and are joined to the leg element 38 along relatively short entering end sections of the opposite longitudinal margins of the leg element 38. These wings are also provided with inturned flanges 56 and 58 respectively along their outer longitudinally extending margins.

In accordance with a feature of the present invention, the stud leg elements 36 and 38 are connected with opposite side margins of the head portion in a manner which facilitates application of the stud portion to an apertured workpiece and also enables the head portion to present a central uninterrupted or imperforate section 60 larger than the workpiece aperture so as to cover the aperture completely. More specifically, the head portion is provided with downturned flanges 62 and 64 integrally joined with opposite side margins of the body section 60 of the head portion. Substantial intermediate portions of the integral junctions between the flanges and the section 60 are slit so that the flanges provide narrow strap-like elements 66 and 68 disposed substantially perpendicularly with respect to the section 60. These strap elements are curved or deformed inwardly toward each other, and the upper ends of the stud leg elements 36 and 38 are respectively integrally joined to lower margins of central portions of the strap elements 66 and 68. Thus, the upper or trailing ends of the stud leg elements 36 and 38 as well as the leading ends of these leg elements are located relatively close together as compared with the width of the head section 60 or, in other words, the leg elements are spaced apart a distance less than the diameter of the workpiece opening 24 for facilitating entry therethrough while the head portion 60 has a width sufficient to completely cover the workpiece aperture. It is also to be noted that the relatively narrow strap portions 66 and 68 will flex when the opposite pairs of wings of the stud portion are shifted toward each other during insertion of the stud portion through the workpiece aperture so as to further facilitate such insertion. Of course, after the wings have passed through the workpiece aperture the strap elements will spring back toward their initial condition and the wings will be resiliently biased outwardly relative to their associated leg elements 36 and 38 toward their original condition so as to urge the shoulder means provided by the ends 70, 72, 74 and 76 of the wings facing the head portion against the under surface of the workpiece or panel for cooperating with the head portion securely to connect the clip to the panel.

While the device 20 might be utilized for connecting a plurality of apertured workpieces together, it is especially suitable for mounting the molding strip 26 to the apertured workpiece. More specifically, opposite ends 78 and 80 of the flange 62 and 82 and 84 of the flange 64 are beveled to provide downwardly and outwardly facing surfaces beneath which the flanges 28 and 30 of the molding strip may be inserted. Upper edges of these ends of the flanges are also beveled so as to avoid interference with the molding strip. In addition downwardly inclined flanges 86 and 88 are provided at opposite ends of the section 60 for cooperating with the downwardly and outwardly facing end edges of the flanges 62 and 64 in retaining the inturned flanges of the molding strip.

It is to be noted that the fastening device may be used in combination with a body of pliable sealing material 89 as shown in the drawing. This sealing material extends around and within the stud leg elements and against the under surface of the head section. It will be appreciated that since the portion of the head section overlying the body of sealing material is uninterrupted or imperforate, the sealing material will be securely pressed against the periphery of the work structure aperture so as to accomplish effective sealing of the aperture when the fastener is fully applied with the work structure.

In Figs. 7, 8 and 9 there is shown a fastening device or clip 20a which is similar to the clip described above as indicated by the application of identical reference numerals with the suffix "a" added to corresponding elements. This embodiment differs only in that tabs 90 and 92 extend laterally outwardly from integral junctions with lower margins of opposite end portions of the flange 62, and similar tabs 94 and 96 extend from opposite ends of the flange 64. These tabs greatly extend the effective width of the head portion so that the clip may be utilized where it is necessary to bridge an opening in a workpiece which is of relatively great width or diameter. It is to be noted that these tabs may be provided on the clip without requiring the use of any more stock material than is required for the clip disclosed in Figs. 1 through 6. The reason for this is that the material which provides the tabs 90–96 would be discarded as scrap when the clip shown in Figs. 1–6 is formed.

Figs. 10, 11 and 12 show another embodiment of the present invention which is similar to the structures described above as indicated by the application of identical reference numerals with the suffix "b" added to corresponding elements. In this embodiment the head section 60b is provided with a dished or arcuately formed transversely extending portion 98. This portion promotes flexing of the head during application of the molding strip to the head so that such application is facilitated.

Fig. 13 shows another embodiment in which elements similar to those described above are designated by the same reference numerals with the suffix "c" added. In this embodiment opposite end portions of the head are inclined inwardly or downwardly in the manner shown so as to adapt the device for application to a curved workpiece 22c. In addition, this embodiment shows how the molding strip may be provided with an arcuate longitudinally extending central portion for facilitating flexing of the molding strip during application thereof to the clip.

Figs. 14, 15 and 16 show another modification of the present invention which is similar to the structures described above as indicated by the application of identical reference numerals with the suffix "d" added to corresponding elements. In this embodiment the head portion is adapted to be applied to molding strips of various widths or to a tapered molding strip. More specifically, one end portion of the head is provided with an arcuate margin 100 so that by turning the fastening device or clip the effective length of the head may be varied in accordance with the width of the molding strip. A flexure spring finger 102 extends from an integral junction 104 with an opposite end of the head portion and normally assumes the position shown in broken lines in Fig. 14, but when the device is applied to the molding strip, the free end of the flexure spring element engages one side of the molding strip so as to bias the head portion so that its opposite ends are maintained in engagement with the opposite flanges of the molding strip.

While the preferred embodiments of the present invention have been shown and described herein, it is obvious that many structural details may be changed without departing from the spirit and scope of the appended claims.

The invention is claimed as follows:

1. A fastening device for application to an apertured work structure comprising a one piece head section for overlying one side of a work structure, a plurality of stud means insertable into a work structure aperture and having entering ends free from each other, and a plurality of elements respectively disposed along different peripheral margins of said head section, said elements respectively having opposite ends integrally joined to their associated margins and an intermediate portion separated from the head section and spaced inwardly of its associated margin, and said stud means respectively being joined to said intermediate portions of said elements.

2. A fastening device, as defined in claim 1, wherein said elements are joined to opposite peripheral margins of said head section, said elements being flexible for permitting relative shifting of said stud means toward each other during application thereof to a work structure aperture.

3. A one piece sheet material fastening device for application to an apertured work structure comprising a one piece head section for overlying one side of a work structure, a plurality of stud means insertable into a work structure aperture and having entering ends free from each other, and a plurality of strap elements respectively connected with opposite peripheral margins of said head section and folded downwardly at an angle from said head section and presenting substantially axially facing margins oppositely from said head section, each of said strap elements having a portion with an axially facing edge substantially abutting and disconnected from said head section, said portion of each of said strap elements extending inwardly of its associated head section margin in a direction extending generally parallel to an undersurface of said head section, said stud means respectively being joined to and extending from the axially facing margins of said portions of said strap elements spaced inwardly of said head section margins and extending from their junctions with said strap elements away from said head section, said head section being substantially imperforate between said stud means.

4. A fastener including a one piece sheet material fastening device, as defined in claim 3, and a body of sealing material disposed beneath said imperforate head portion and surrounding said stud means.

5. A fastening device, as defined in claim 3, wherein said elements have opposite end portions integrally joined to said head section and laterally inwardly deflected central portions providing the portions to which said stud means are joined.

6. A fastening device for application to an apertured work structure comprising a one piece head section for overlying one side of a work structure, a pair of stud means extending generally axially from said head section and insertable into said work structure aperture and having entering ends free from each other, and a pair of strap elements respectively disposed along different peripheral margins of said head section, said strap elements respectively having opposite ends integrally joined with said head section and intermediate portions disconnected from and spaced inwardly of their associated margins along an under surface of the head section, said stud means respectively being joined to portions of said strap elements spaced inwardly of said margins, each of said stud means including a leg portion extending generally axially from its junction with its associated strap element, and away from said head section and laterally projecting wings extending along longitudinal edges of said leg and joined only to relatively short entering end portions of said edges, said wings presenting shoulders facing generally toward said head section for engaging a surface of a work structure oppositely from said head section.

7. A fastening device, as defined in claim 6, which includes means at opposite margins of said head section for overlying inturned flanges of a molding strip and the like for securing the molding strip.

8. A fastening device, as defined in claim 7, wherein said last mentioned means includes flanges depending from said peripheral margins of said head section and integrally connecting said strap elements to said head section, and beveled downwardly and outwardly facing end edges on said last mentioned flanges for overlying the flanges of the molding strip.

9. A fastening device, as defined in claim 8, wherein said last mentioned means includes additional flanges extending downwardly and outwardly from opposite ends of said head section adjacent said beveled end edges.

10. A fastening device, as defined in claim 7, wherein said head has an arcuate transversely extending portion for facilitating flexing of the head section during relative application of a molding strip and the like to the head section.

References Cited in the file of this patent

UNITED STATES PATENTS

| | | |
|---|---|---|
| 2,685,721 | Eves | Aug. 10, 1954 |
| 2,698,979 | Flora | Jan. 11, 1955 |
| 2,786,249 | Poupitch | Mar. 26, 1957 |
| 2,885,754 | Munse | May 12, 1959 |

UNITED STATES PATENTS

| | | |
|---|---|---|
| 1,026,938 | France | Feb. 11, 1953 |